(12) United States Patent
Kuznetsov et al.

(10) Patent No.: US 10,899,187 B2
(45) Date of Patent: Jan. 26, 2021

(54) METHOD OF MAKING AUTOMOTIVE LEAF SPRINGS

(71) Applicants: Anatoliy Alekseevich Kuznetsov, Moscow (RU); Arkadiy Moiseevich Peker, Odintsovo Moskovskaya (RU); Semyon Brayman, West Bloomfield, MI (US)

(72) Inventors: Anatoliy Alekseevich Kuznetsov, Moscow (RU); Arkadiy Moiseevich Peker, Odintsovo Moskovskaya (RU); Semyon Brayman, West Bloomfield, MI (US)

( * ) Notice: Subject to any disclaimer, the term of this patent is extended or adjusted under 35 U.S.C. 154(b) by 37 days.

(21) Appl. No.: 16/194,772

(22) Filed: Nov. 19, 2018

(65) Prior Publication Data
US 2020/0156428 A1    May 21, 2020

(51) Int. Cl.
*B60G 11/02*   (2006.01)
*C21D 1/06*    (2006.01)

(52) U.S. Cl.
CPC .............. *B60G 11/02* (2013.01); *C21D 1/06* (2013.01); *B60G 2202/11* (2013.01); *B60G 2206/428* (2013.01); *B60G 2206/72* (2013.01); *B60G 2206/8403* (2013.01); *C21D 2211/008* (2013.01)

(58) Field of Classification Search
CPC .............. B60G 11/02; B60G 2206/428; B60G 2206/72; C21D 1/06
See application file for complete search history.

(56) References Cited

U.S. PATENT DOCUMENTS

| | | | |
|---|---|---|---|
| 9,573,432 B2* | 2/2017 | Wilson | B60G 11/02 |
| 2005/0279434 A1* | 12/2005 | Pacher | C22C 38/001 267/158 |
| 2017/0130288 A1* | 5/2017 | Fukuoka | C22C 38/04 |
| 2017/0144500 A1* | 5/2017 | Kuznetsov | F16F 1/185 |

* cited by examiner

*Primary Examiner* — Faye M Fleming
(74) *Attorney, Agent, or Firm* — John R. Benefiel

(57) ABSTRACT

Automotive leaf springs are produced from low-hardenability and specified hardenability steel, with identical and different length, width and thickness and constant or variable cross section profile, that are subjected to through-surface hardening and low tempering. The ideal critical diameter of hardening, carbon content and hardened layer depth depend on the thickness of constant cross section profile leaf and maximum and minimum thicknesses of variable cross section profile leafs. Adherence to the optimum correlations of parameters indicated make it possible to produce leaf springs with the best mechanical properties and longevity.

2 Claims, 1 Drawing Sheet

METHOD OF MAKING AUTOMOTIVE LEAF SPRINGS

CROSS REFERENCE TO RELATED APPLICATIONS

This application is a Continuation of U.S. Ser. No. 15/343,554 filed on Nov. 4, 2016 which claims the benefit of U.S. provisional patent application No. 62/253,749 filed on Nov. 11, 2015, and a continuation in part of U.S. Ser. No. 13/991,961 with a 371(c)(1)(2)(4) date of Oct. 6, 2014 now U.S. Pat. No. 10,100,391.

BACKGROUND OF THE INVENTION

The invention relates to case hardening of leafs of automotive leaf springs.

An automotive leaf spring is known (see patent RU #2213280) that consists of several leafs of identical width and different length with a constant or variable profile. It is also known that such leaf springs are produced from low hardenability (LH) steel subjected to through-surface hardening (TSH). However, as a result of the thermal treatment, each spring leaf had a non-homogenous cross section microstructure: a 52-60 HRC hardness martensite in the surface layer and 25-40 HRC hardness troostite-sorbite structure in the core.

A positive technical outcome was achieved because such leaf spring showed better bench and field test results compared to commercially produced leaf springs. The latter consist of leafs that are made from alloyed spring steels and subjected to traditional thermal treatment—oil quenching with medium tempering at 400-500° C. to produce a homogenous martensite-microstructure cross section with 40-50 HRC hardness, followed by shot/stress peening of the surface.

The performance requirements for leaf springs manufactured in Germany, USA and other Western countries are much more stringent as compared to performance requirements in the Russian Federation. In order to meet these stringent performance requirements, leaf springs are manufactured to higher and tighter hardness ranges. For example, the hardness range is sometimes set at 46-50 HRC or 48-52 HRC, and the leaf bench load is 800+600, while in the Russian Federation it is 500±300 N/mm$^2$ (See patent RU #2213280). Testing of 11-13 mm thick LH steel leaf plates subjected to TSH and low tempering (per patent RU #2213280) showed that, at higher loads, in some cases the leaf spring did not pass the verification criterion of 150,000 cycles.

In addition, occasional failures of individual LH steel leafs and entire leaf spring assemblies subjected to TSH and low temperature tempering occurred as a result of bulldozing of assembled leaf springs in the through central hole or the central indentation in the blind hole. Failures were also caused by greater brittleness of this area due to high hardness of the continuously martensite structure surface 56-62 HRC.

The object of this invention is to provide a new automotive leaf spring that is made from low hardenability (LH) or specified hardenability (SH) steel that are subjected to TSH to provide higher reliability and durability.

SUMMARY OF THE INVENTION

The present invention comprises a method of making a constant profile case hardened leaf for an automotive leaf spring from low hardenability (LH) or specified hardenability (SH) steel of a thickness H, in which the steel contains 0.4 to 0.8% carbon for leaf thicknesses of 8 mm or more and has 0.2-0.4% of carbon for leaf thicknesses less than 8 mm, and has an ideal critical hardening diameter Din mm within the range of 0.6H to 1.2H, for leaf thicknesses of 8 mm or more, the leaf thereafter subjected to through-surface hardening (TSH) and low temperature tempering so as to form a hardened layer thickness of $\delta$ (0.1H-0.22H) all along the leaf.

The invention also includes a method of making a variable thickness case hardened leaf for an automotive leaf spring with a maximum thickness $H_0$ and a minimum thickness of $h_0$ by forming the leaf with a ratio of the maximum thickness of $H_0$ and the minimum thickness $h_0$ of 0.45 $H_0$, and using a low hardenability (LH) or specified hardenability (SH) steel and having a critical hardening diameter $D_{cr}$ within the range of (0.95-1.2) $h_0$ or (0.55-0.75) $H_0$ and hardening a leaf so formed by through surface heating (TSH) so as to produce a hardened layer depth $\delta$=(0.95-1.2) $h_0$ at the thin section and a depth of a hardened layer $\delta$=(0.07-1.125) $H_0$ at the spring seat.

DETAILED DESCRIPTION OF DRAWINGS

DETAILED DESCRIPTION

Figure 1:
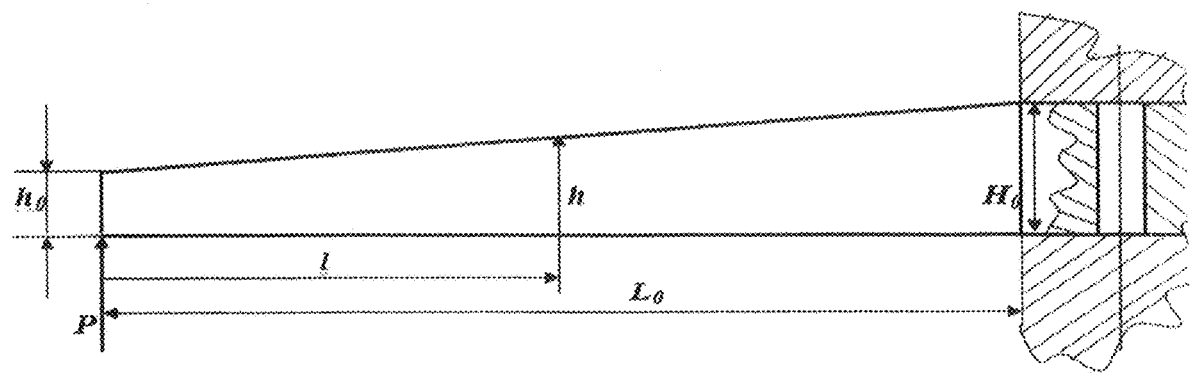
FIG. 1 is a diagram of a variable cross section spring leaf with a cantilever beam used as an example.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

The use of "third generation", i.e., the most recently developed low hardenability (LH) and specified hardenability (SH) steels described in U.S. Pat. No. 10,100,391 to produce 8-50 mm thick spring leafs, with the steel chemical composition conforming to Russian Federation patents #2450060, bul. #13 dated 10 May 2012, and #2450079, bul. #13, dated 10 May 2012, and U.S. Pat. No. 10,100,391 wherein the carbon content is 0.4-0.8%; whereas for thicknesses under 8 mm the carbon content is 0.2-40%; wherein the ideal critical hardening diameter $DL_{cr}$, Of LH and SH steels conforms to the spring leaf thickness in order to facilitate formation of an optimum hardened layer depth during TSH. This pertains to spring leafs with constant and varying profile thickness (See Tables ##1 and 2, that show optimum $DI_{cr}$. value of LH and SH steels for various spring leaf thicknesses);

The elimination of the ferrite-structured, completely decarburized zone in the hardened surface layer that has a purely martensite structure; with partial surface decarburization (not less than 0.15%); the presence of a low-carbon martensite structure which prevents abrupt fatigue strength reduction, compared to commercially produced spring leafs with troostite micro structure, followed by shot blasting of the surface;

The use of LH steels with 0.2-0.4% carbon and $DI_{cr}$.=6-10 mm is used to produce spring leafs with a thickness under 8 mm. This provides for hardening of the entire spring leafs or its sections with a thickness under 8 mm to form a low-carbon martensite structure throughout the cross section, or 45-58 HRC martensite in the surface layer and troosto-martensite in the core. Higher carbon content in the LH steel (0.4-0.8%) corresponds to the prototype described in patent RU #2213280 results in lower fatigue strength and durability with through hardening. Conversely, through hardening of thin cross sections of steel parts with 0.2-0.4% carbon to form a homogenous low-carbon martensite structure with ##I-4 acircularity (GOST 8233-56) provides for higher cyclic durability and attainment of results commensurable with spring leafs produced commercially with shot peening. This is explained by smaller tensile residual stresses in surface layers, reasonably high overall strength ($G=1800-2400$ N/mm$^2$) and ductility ($\psi$=30-50%).

The use of cold-work hardening by shot blasting, roller burnishing, ultrasound and any other method of mechanical impacting martensite-structure, high hardness (52-60HRC) surfaces of LH or SH steel spring leafs (commercial production technology uses shot peening of leafs made from traditional spring steel with 40 HRC through troostite structure). In the present process, there is a qualitative improvement in the microstructure of the most highly stressed surface martensitic layer. The latter transforms into textured martensite with deformed oval-shaped borders of "former" austenite grains. This results in a higher fatigue strength and cyclic durability in the transitional area of limited endurance that considerably exceed the indices for LH steel leaf springs after TSH, with a martensite structure without shot peening (patent RU #2213280), and leaf springs hardened by the traditional method of shot peening of leafs with a troostite structure.

Elimination of another defect mentioned above, i.e., the occasional failure of the entire leaf spring or its part along the central zone (the hole or its vicinity) during static bulldozing of assembled leaf springs or overloading during operation is also an improvement achieved by this invention. These breakages result from accumulation of local stress concentrators in the hole zone and the presence of a brittle martensite structure on the hole I.D. or tapered central indentation. Limiting the continuous martensitic hardening zone and preventing it from spreading to the hole zone and its adjoining area is an effective means to reduce brittleness and avoid breakages during static and fatigue loading.

For example, special plugs were used to prevent the quenching fluid from entering the Ø13 mm central hole itself and adjoining Ø30 mm flat area from both sides. The microstructure of these surfaces was a troosto-sorbite mixture with martensite inclusions, i.e., partial martensite structure penetration in the hole area had occurred. But these local hardened sections that were formed due to gaps between the protective plugs and spring leaf surfaces did not affect the subsequent test results because the local microplastic deformation during spring leaf bulldozing occurred in areas adjacent to plastic non-martensite structures that resulted in relaxation of local stresses caused by external forces. During the test, binding all of the spring leafs were connected together with a bolt placed in the central hole or with special binding fasteners. The external load in this zone is thereby sharply reduced and presents no danger of a later failure.

Static and cyclic tests of a prototype batch of springs with leafs made from LH steel subjected to TSH, with areas of restricted hardening in the vicinity of the leaf spring central hole, turned out to be positive: not a single leaf spring being tested broke under static load nor under fatigue loading until the nominal number of cycles was completed, and not a single leaf broke in the central hole when the permissible loads were exceeded.

Non-availability of the main characteristics of the steel used, namely LH or SH steel ideal critical hardening diameter and carbon content depending on the spring leaf thickness constitutes the main shortcoming of the known materials.

The present invention requires specific limiting values of the LH and SH steel ideal critical diameter ($DI_{cr}$.) and carbon content which depends on the thickness of constant and variable profile spring leafs. These main characteristics are absent in the known materials.

For example, based on thermophysical calculations for leafs with a constant cross section profile and thickness H (mm), $DI_{cr}$, min is 0.6 H, mm but not less than 6.0 mm, while $DI_{cr}$ max is 1.2 H, mm, i.e. $DI_{cr}$, is (0.6-1.2)H, mm, which produces a the $\delta$=(0.1-0.22) H hardened layer depth.

Table 1 shows permissible $DI_{cr}$. values of the hardened layer depth $\delta$ with respect to the constant-profile leaf thickness H. The carbon content in the steel is 0.4-0.8%.

TABLE 1

| H, mm | 8 | 9 | 10 | 12 | 14 | 16 | 18 | 20 | 22 | 24 | 30 | 40 | 45 | 50 |
|---|---|---|---|---|---|---|---|---|---|---|---|---|---|---|
| $DI_{cr}$, mm | 6-10 | 6-11 | 6-12 | 7-14 | 8-16 | 10-19 | 11-21 | 12-24 | 13-26 | 14-28 | 18-36 | 24-48 | 27-54 | 30-60 |
| $\delta$, mm | 0.8-1.7 | 0.9-2.0 | 1.0-2.2 | 1.2-2.6 | 1.4-3.1 | 1.6-3.5 | 1.8-4.0 | 2.0-4.4 | 2.2-4.8 | 2.4-5.3 | 3.0-6.6 | 4.0-8.8 | 4.5-10.0 | 5.0-11.0 |

The ideal critical hardening diameter for constant cross section profile leafs whose thickness H is less than 8 mm is: $DI_{cr}$.>6 MM, and wherein C=0.2-0.4%.

Various optimal designs have been developed for variable cross section profile leafs that are eligible for TSH.

FIG. 1 shows the loading diagram of a spring leaf half with a fixed central section.

In the case, the maximum bending stress is $\sigma_{bend.}=6Pl/bh^2=$const, where:

P is the support reaction (const);

l is the length of the arm of force P;

h is a variable value equal to the leaf thickness over length l;

$L_0$ is the distance from the leaf end (end reaction point) to the fixed-end (const);

b is the leaf width (const); $H_0$, $h_0$ are the biggest and smallest leaf thicknesses (const).

By substituting $L_0$ for l and $H_0$ for h in the formula, we get:

$$\sigma_{bend.}=6PL_0/bH_0^2=\text{const};$$

By equating the two expressions, we get $h/H_0=\sqrt{(l/L_0)}$

Figure 2:
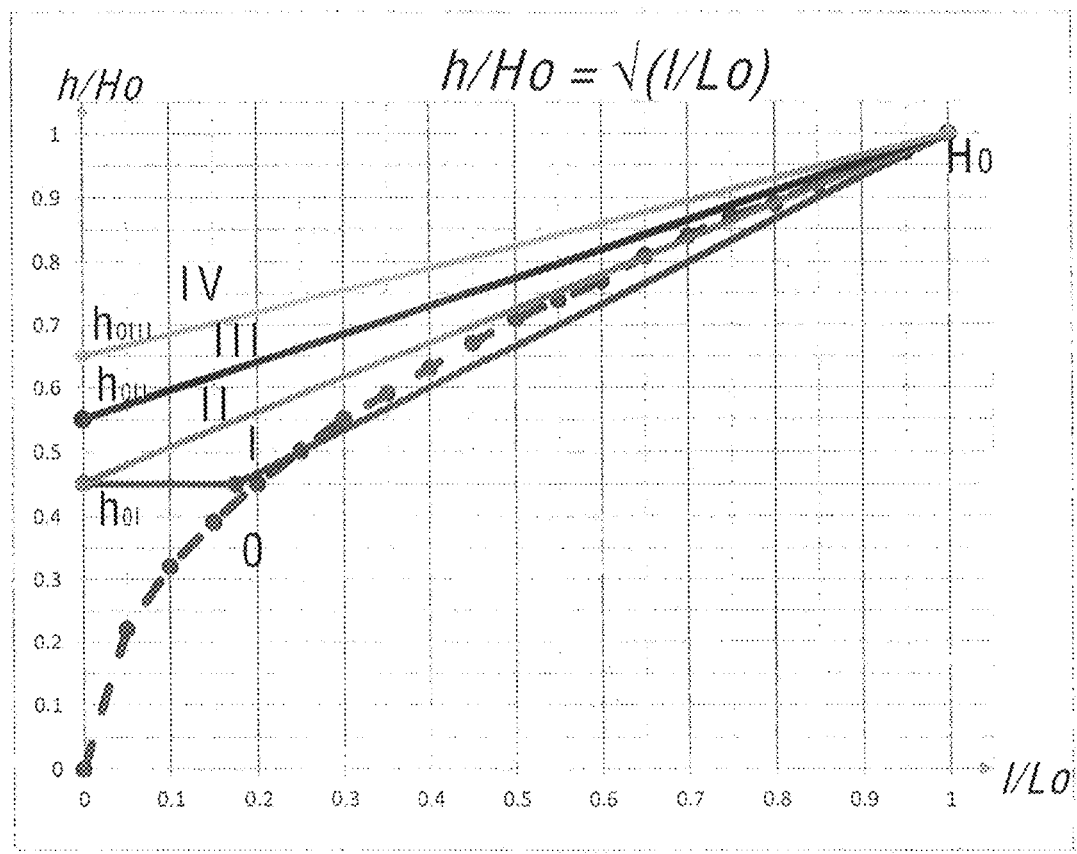
FIG. 2 is a diagram relative leaf thickness $h/H_0$ versus the relative length/$L_0$.

FIG. 2 is a graph that shows the relative leaf thickness $h/H_0$ versus the relative length $l/L_0$. The graph depicts a theoretical contour of a constant cross section leaf, i.e., the dot-and-dash curve.

These are five zones plotted, three of which are confined to straight lines:

0—zone with overloaded thin end leaf sections compared with thicker, underloaded mid-sections;

I—minimum TSH application zone—$h_0/H_0=0.45$ min;

II—most optimal TSH application zone—$h_0/H_0=0.45$-$0.55$;

III—TSH-acceptable zone which, however, is a high structural rigidity zone—$h_0/H_0$-$0.55$–$0.65$;

IV—irrational configuration zone, where the leaf mass, rigidity and load non-uniformity during bending along its length increases sharply; its low at the end of the zones and maximum in the central zone.

With $h_0/H_0>0.65$, the TSH method may practically be applicable, and, as it approaches $h_0/H_0=1$, the spring leaf will have a constant profile.

Thus, in case of variable profile leafs, minimum thickness $h_0$ is the limiting parameter for thermophysical calculations.

With $DI_{cr}$, min=$0.95\ h_0$ (mm) $DI_{cr}$, max=$1.2\ h_0$, the harden layer depth is:

For zone I and II: $h_0=(0.45$-$0.55)H_0$, $\delta=(0.15$-$0.22)h_0$ or $\delta=(0.07$-$0.12)H_0$, $DI_{cr}=(0.095$-$1.2)h_0=(0.4$-$0.65)H_0$ For zone III: $h_0=(0.55$-$0.65)H_0$, $\delta=(0.15$-$0.22)h_0$ or $\delta=(0.08$-$0.145)H_0$, $DI_{cr}=(0.95$-$1.2)h_0=(0.5$-$0.75)H_0$ Table 2 shows permissible ideal critical hardening diameters $DI_{cr}$, of steel with 0.4-0.8% C depending on the thickness variation—from minimum $h_0$ (mm) to maximum $H_0$ (mm) with the most optimal variable cross section profile ratio $h_0/H_0=0.5$.

are also selected from broad limits—(6-60 mm) and (7-30 mm), respectively. Within the framework of Russian Federation patents #2450060, #13, Oct. 5, 2012; and #2450079, #13, Oct. 5, 2013, with the same $DI_{cr}$, steel chemical elements other than carbon have no impact.

A qualitatively new solution with regard to thermal strengthening of constant and variable cross-section spring leafs is a combination of TSH and thermochemical treatment (TCT)—carburization (C) or high temperature carbonitriding (CN).

Practically completely eliminates spring leaf surface decarburization to the matrix that had occurred during rolling; the carbon content in steel is 0.2-0.4. In this case, the maximum carbon content in the martensite-structure surface layer should not exceed 0.8%, while the minimum carbon content should be more than 0.2% higher than that in the matrix that has a martensite, troosto-martensite, troostite structure (depending on the leaf thickness);

Reduces the minimum thickness of constant profile leafs subjected to thermal treatment from 8 mm (TSH) to 5 mm (TCT), and that of variable profile leafs from 8/16 mm (TSH) to 5/10 mm–(TSH+TCT);

Improves the leaf spring durability by additionally creating beneficial residual compressive stresses in the leaf surface layer that were formed as a result of the TCT; and, Work hardens the spring leaf surface from its stressed side, during operation, that was effected by shot peening or another mechanical method resulting in higher fatigue endurance similar to what was described above.

The invention claimed is:

1. A method of making a constant profile case hardened leaf for an automotive leaf spring comprising forming said leaf from low hardenability or specified hardenability steel of a thickness H, said steel containing 0.4 to 0.8% carbon for leaf thicknesses of 8 mm or more and 0.2-0.4% of carbon for leaf thicknesses less than 8 mm, and having an ideal critical hardening diameter $D_{cr}$ in mm within the range of 0.6H to 1.2H for leaf thicknesses of 8 mm or more, and, said formed leaf thereafter subjected to through-surface hardening and low temperature tempering so as to form a hardened layer thickness within the range of $\delta$ (0.1H-0.22H) all along said leaf.

2. A method of making a variable thickness case hardened leaf for an automotive leaf spring with a maximum thickness $H_0$ and a minimum thickness of $h_0$ comprising:

forming said leaf of steel containing 0.4 to 0.8% carbon for leafs of a minimum thickness over 8 mm and

TABLE 2

| h0/H0 = 0.5 | 8/16 | 9/18 | 10/20 | 11/22 | 12/24 | 14/28 | 16/32 | 18/36 | 20/40 | 25/50 |
|---|---|---|---|---|---|---|---|---|---|---|
| $DI_{cr}$, mm | 7-10 | 8-11 | 9-12 | 10-14 | 11-15 | 13-17 | 15-20 | 17-22 | 18-24 | 23-30 |
| $\delta$, mm | 1.2-1.8 | 1.3-2.0 | 1.5-2.2 | 1.6-2.4 | 1.8-2.6 | 2.1-3.1 | 2.4-3.5 | 2.7-3.9 | 3.0-4.4 | 3.7-5.5 |

Therefore, the TSH method is applicable for hardening of spring leafs thicker than 8 mm.

For variable profile leafs, with the minimum thickness of less than 8 mm and maximum more than 8 mm, i.e. $h_0<8$ mm, $H_0=(8$-$16)$ mm, $DI_{cr}=(6$-$10)$ mm, C=0.2-0.4%.

An important distinctive feature of this invention is the specific dependence of two main LH (SH) steel parameters, i.e., its carbon content (% C) and ideal critical diameter $DI_{cr}$, on the leaf thickness $H(h_0)$. In this case, the permissible nominal carbon content of a specific steel with narrow tolerances (±0.05% or +0.025%) is selected from broad limits (0.2-0.8% C). For constant and variable cross section profile leafs, permissible ideal critical diameter $DI_{cr}$, values containing 0.2 to 0.4% of carbon for a minimum thickness leaf less than 8 mm, with a ratio of said maximum thickness of $H_0$ and said minimum thickness $h_0$ of 0.45 $H_0$ using a low hardenability or specified hardenability steel having a $D_{cr}$ within the range of either 0.95 $h_0$ to 1.2 $h_0$ or of 0.55 $H_0$ to 0.75 $H_0$, and hardening said leaf so formed by through surface hardening of said leaf so as to produce a hardened layer depth $\delta$ in the range of 0.95 $h_0$ to 1.2 $h_0$ at said minimum thickness and a depth of a hardened layer $\delta$ within the range of 0.07 $H_0$ to 1.125 $H_0$ at said maximum thickness.

* * * * *